UNITED STATES PATENT OFFICE.

CHARLES WEIZMANN, OF RUSHOLME, MANCHESTER, ENGLAND, ASSIGNOR TO THE CLAYTON ANILINE COMPANY, LIMITED, OF CLAYTON, ENGLAND.

PROCESS OF MAKING ISOBORNYL ESTERS.

No. 910,978.   Specification of Letters Patent.   Patented Jan. 26, 1909.

Application filed March 5, 1908. Serial No. 419,246.

*To all whom it may concern:*

Be it known that I, CHARLES WEIZMANN, of Rusholme, Manchester, England, have invented certain new and useful Improvements in the Manufacture of Isobornyl Esters, of which the following is a specification.

The processes which hitherto have been considered most successful for the manufacture of isobornylesters are either double decomposition between pinene hydrochlorid and a salt of one of the heavy metals, such as zinc, or lead, on catalytic action of a zinc compound on a boiling mixture of pinene hydrochlorid and a fatty acid, but these processes have the disadvantage that a considerable amount of resinous matter is formed, and, as this is of much less value than isobornyl acetate, the formation of such resinous matter is a serious objection to the processes, and it is the object of this invention to overcome this objection.

According to this invention a mixture of pinene hydrochlorid and a fatty acid is boiled, or heated to a suitable temperature, in the presence of metallic zinc (preferably in a fine state of division) whereby a product is obtained consisting mainly of isobornyl ester free, or practically free, from resinous matter. This result was not to be anticipated because zinc in the presence of fatty acid is known to exert a powerful reducing action on halogen organic compounds, and therefore it was to be presumed that the substances which would be produced would be such reduction products as camphane, dicamphyl, or similar reduction products instead of the product which I obtain.

The following is an example of the manner in which this invention may be carried into effect, but I do not limit myself to this example. The parts are by weight. A mixture of 100 parts of pinene hydrochlorid, 300 parts of glacial acetic acid, and 30 parts of zinc dust, is gently boiled in a reflux apparatus, or heated on a boiling water bath, until a sample of the mixture (after making it alkaline with caustic soda) yields an oil free from chlorin, this generally being the case after about 20 hours boiling or heating. The excess of acetic acid is then removed by distillation of the product of reaction under reduced pressure at 40° centigrade and 15 mm., and the isobornylacetate is separated by pouring the residual oil into water; crude isobornylacetate separates out, which is decanted and redistilled under reduced pressure at a temperature of 100° to 120° at 15 mm. to 18 mm., (mm. indicating millimeters.)

The probable course of the reaction is the following: The metallic zinc removes in the first instance hydrochloric acid from the pinene hydrochlorid and forms camphene.

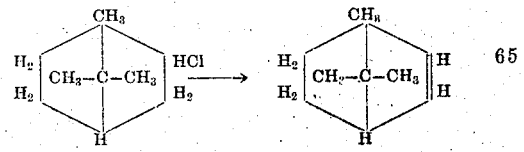

Pinene hydrochlorid.   Camphene.

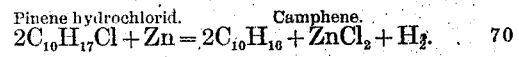

The camphene formed acts *in statu nascendi* on the acetic acid in presence of $ZnCl_2$, and yields isobornylacetate

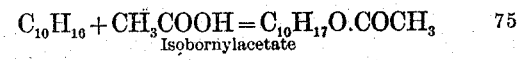

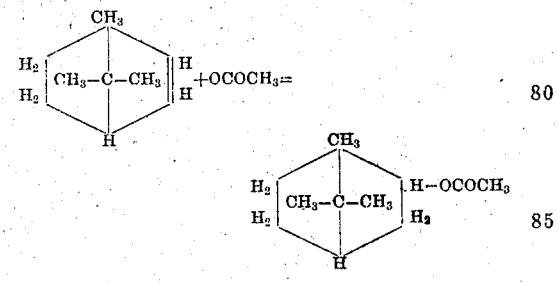

The superiority of the yield is evident from the following facts: I obtain by the method herein described, a yield amounting to 72% to 75% of the theory, starting from pinenehydrochlorid, which is a technical product and by no means chemically pure; whereas by the other methods the yield is 65% to 66% of theory. The better yield is due to the fact that, in taking metallic zinc, no water is formed during the reaction and the hydrogen, which is evolved during the process prevents oxidation, consequently also resinification of the product.

I claim:—

1. The process of manufacturing isobornylesters, the herein described steps, to wit: heating a mixture of pinenehydrochlorid and fatty acids in the presence of metallic zinc.

2. The manufacture of isobornylesters by digesting a mixture of pinenehydrochlorid and fatty acids with metallic zinc, until a sample of mixture after making alkaline yields an oil free from chlorin, then distilling off the acetic acid, washing the oil and fractionating the crude isobornylester under reduced pressure.

In testimony whereof I have affixed my signature, in presence of two witnesses.

CHARLES WEIZMANN

Witnesses:
 ERNALD SIMPSON MOSELEY,
 MALCOLM SMETHURST.